United States Patent [19]
Watson

[11] Patent Number: 5,439,343
[45] Date of Patent: Aug. 8, 1995

[54] MINI BOOM BUMPER

[76] Inventor: Jeff Watson, Box 53, Mountain View, Alberta, Canada

[21] Appl. No.: 221,238

[22] Filed: Mar. 31, 1994

[30] Foreign Application Priority Data

Apr. 13, 1993 [GB] United Kingdom ............... 9307497

[51] Int. Cl.⁶ ............................................. B66C 5/00
[52] U.S. Cl. ............................... 414/744.3; 212/180; 280/766.1; 293/117
[58] Field of Search ............ 414/680, 743, 280, 744.2, 414/744.3; 212/180, 186, 187, 188, 189; 293/117; 280/766.1, 763.1

[56] References Cited

U.S. PATENT DOCUMENTS 3,854,594 12/1974 Brookes .
3,952,893 4/1976 Kolesar .
4,419,038 12/1983 Pendergraft .
4,746,263 5/1988 Cook .
5,135,074 8/1992 Hornagold ............... 182/2
5,211,526 5/1993 Robinette ............... 414/543 X

FOREIGN PATENT DOCUMENTS 130171 10/1959 U.S.S.R. ............................... 212/189

Primary Examiner—Donald W. Underwood
Attorney, Agent, or Firm—Murray E. Thrift; Adrian D. Battison; Stanley G. Ade

[57] ABSTRACT

A combined bumper and hoist for use on a vehicle has an elongate housing that mounts transversely across the end of the vehicle as a bumper. A hoist having a mast and a boom is pivotally mounted in the housing for movement between a stored position collapsed into the housing and a raised position with the mast upright and the boom projecting laterally from the mast. The raising of the hoist simultaneously lowers two legs from the bumper to support the bumper on the ground. All of the hoist functions, including raising the hoist to the use position, rotating the mast about its axis and raising and lowering the boom are performed hydraulically. The boom may be equipped with various accessories, including a chain hook and a jib carrying a cherry picker bucket.

15 Claims, 3 Drawing Sheets

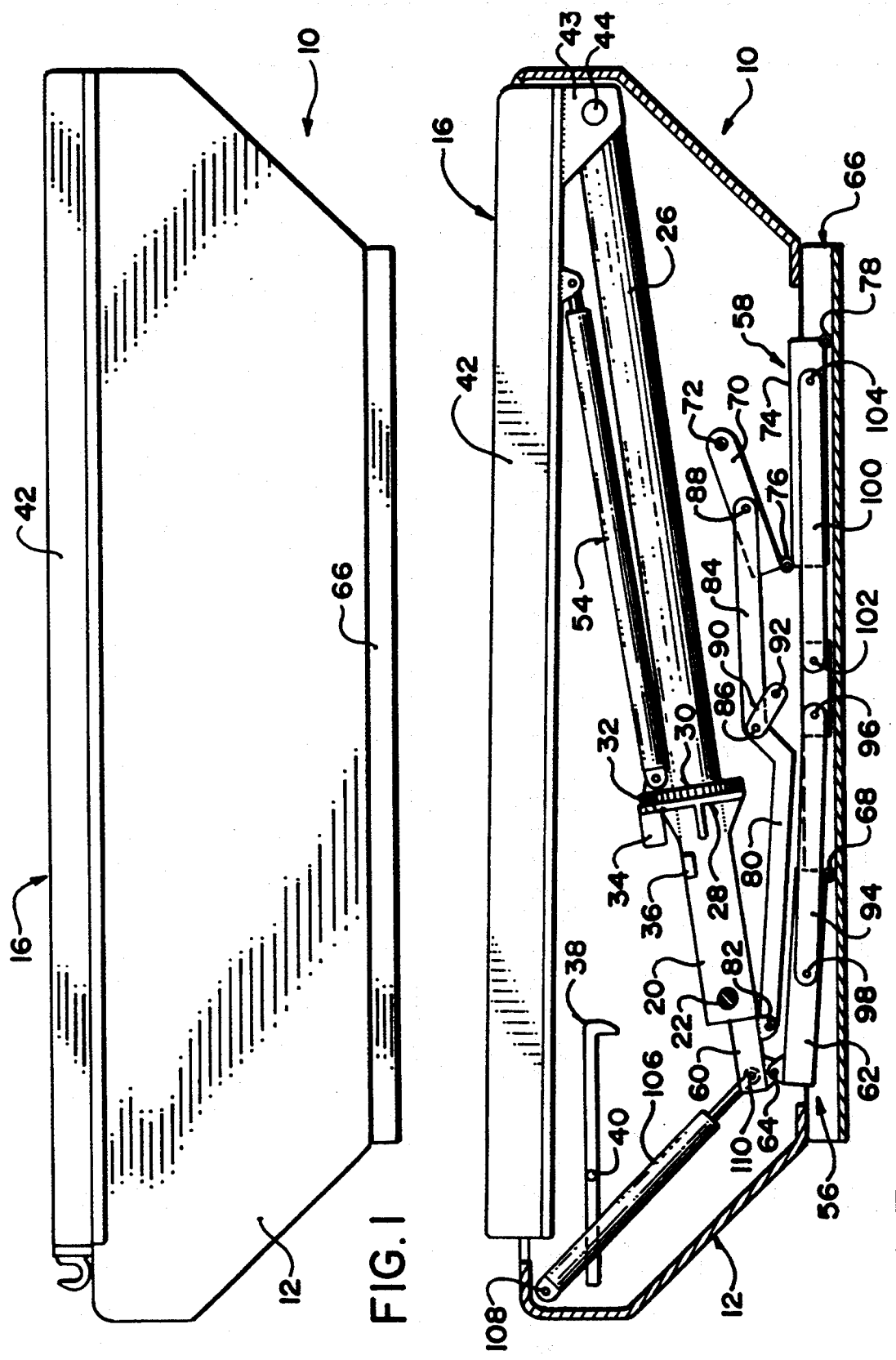

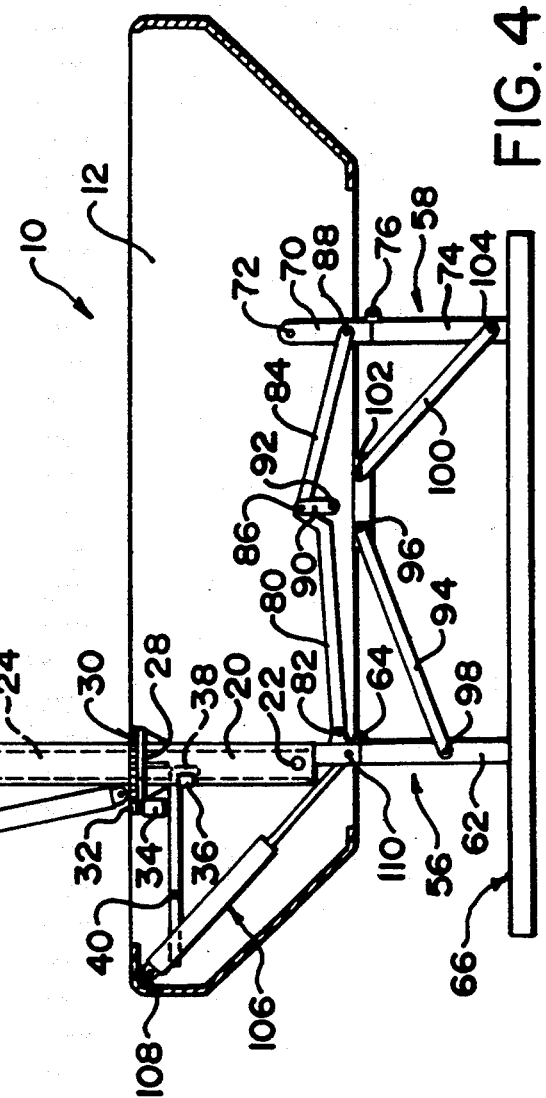
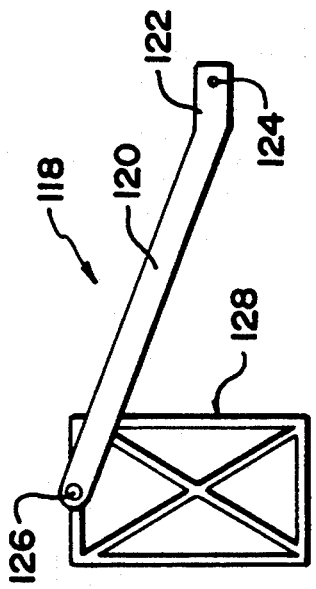
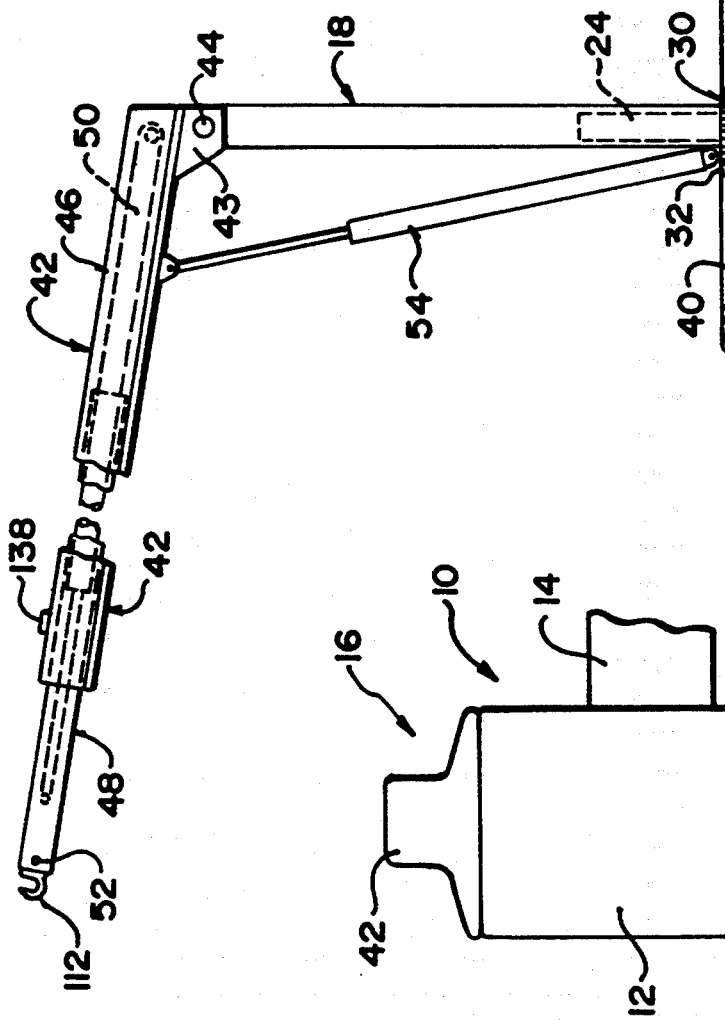

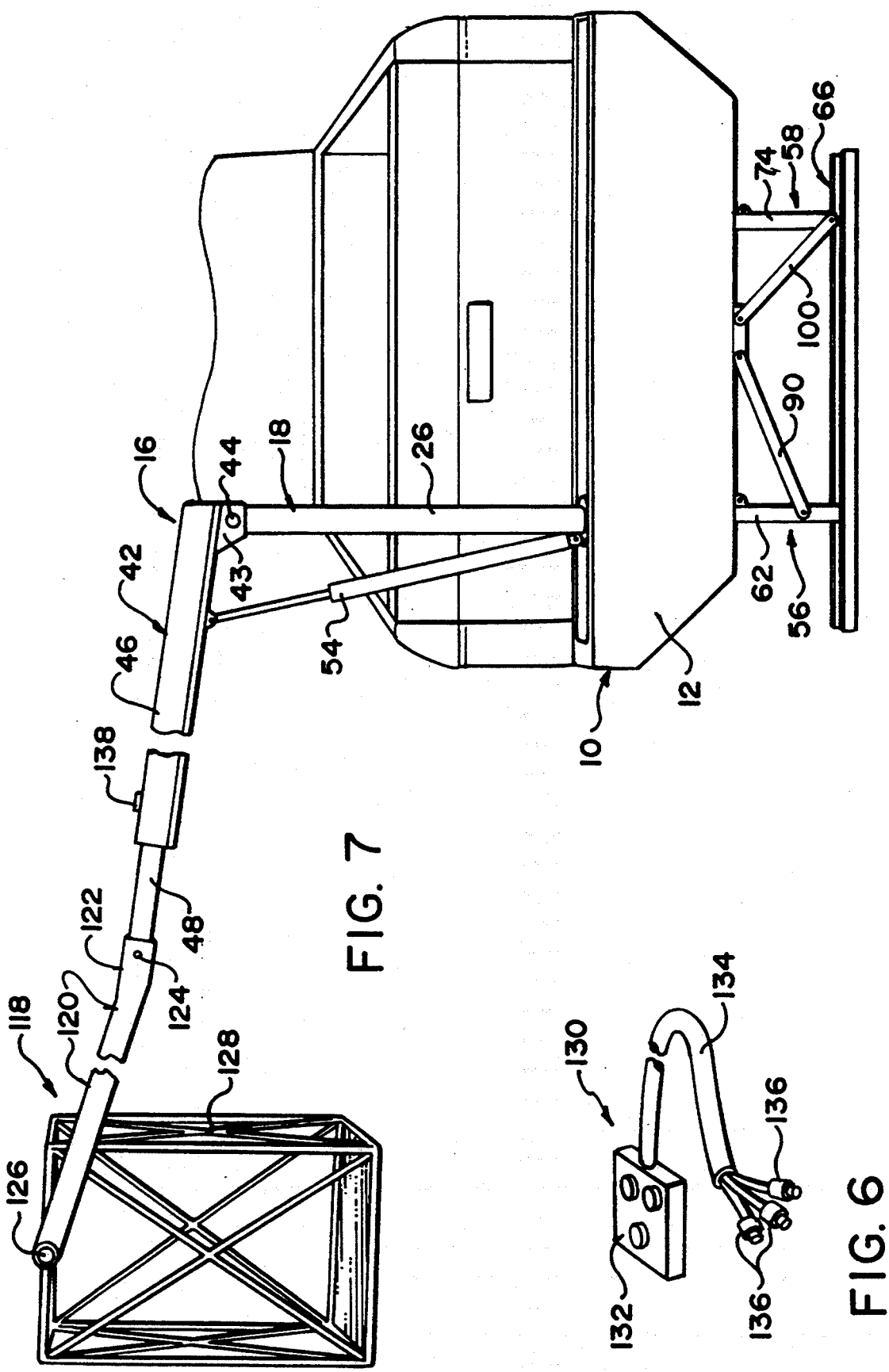

MINI BOOM BUMPER

FIELD OF THE INVENTION

The present invention relates to hoists and more particularly to a fold down hoist that collapses into a vehicle bumper.

BACKGROUND

The present invention is intended to provide a collapsible hoist that folds down into the bumper of a truck or the like. Hoists of this type are disclosed in Pendergraft U.S. Pat. No. 4,419,038, issued Dec. 6, 1983 and in Cook U.S. Pat. No. 4,746,263, issued May 24, 1988. These are relatively light duty hoists. They have fixed booms and use cables for load lifting. While their mast and boom assemblies may be rotated, this is done manually. In Pendergraft, the unit may be supported on screw jacks, but these must be manually installed and set. In Cook's hoist, the mast stores a single manually operated jack.

The present invention aims at the provision of certain improvements in hoists of this general type.

SUMMARY

According to the present invention, there is provided a hoist comprising:
- an elongate housing;
- means for mounting the housing across a vehicle frame as a bumper;
- a mast pivotally mounted on the housing for movement between a stored, lateral position within the housing and an upright, extended position projecting upwardly out of the housing;
- a boom pivotally mounted on the mast for pivotal movement between a stored position extending along the mast and an in-use position projecting from the mast;
- support legs mounted on the housing at positions spaced therealong for movement of each leg between a stored position substantially within the housing and an extended position projecting downwardly from the housing for supporting the housing on a ground surface; and
- linkage means coupling the support legs and the mast for moving the support legs between the stored and extended positions of the support legs simultaneously with movement of the mast between the stored and extended positions of the mast.

With this arrangement, the hoist cannot be raised to be used without the support legs being set in place. This not only minimizes the operator's work in setting up the hoist, but it serves as a safety feature, ensuring that the hoist will not be used when supported only by the vehicle's spring suspension. This is of considerable importance with a hoist that has a relatively high load capacity.

In preferred embodiments of the hoist, the mast is rotatable and the boom may be telescopically extended. The various functions, including mast and leg erection, mast rotation, and boom elevation and extension, are all performed using hydraulic cylinders and motors. The hoist is suitable for use as a general purpose hoist. It may also be equipped with a jib and a bucket for use as a "cherry picker". In this latter application, it is beneficial to have a remote control unit coupled to the hydraulics through a quick release fitting near the end of the boom. The hoist can then be controlled from a variety of locations: on the ground; in the truck box; or by an occupant of the bucket. A winch and pulley may also be mounted on the unit.

BRIEF DESCRIPTION OF THE DRAWINGS

In the accompanying drawings which illustrate an exemplary embodiment of the present invention:

FIG. 1 is a rear view of the hoist in the stored condition;

FIG. 2 is an end view of the hoist in the stored condition;

FIG. 3 is a view like FIG. 1 with the back side of the housing omitted to show the internal arrangement;

FIG. 4 is a view like FIG. 3 of the hoist in its extended condition;

FIGS. 5 and 6 illustrate various attachments for the hoist; and

FIG. 7 illustrates the hoist attached to a pick-up truck, with the bucket attached,

DETAILED DESCRIPTION

Referring to the accompanying drawings, there is illustrated a vehicle bumper 10 including a housing 12 that mounts on a vehicle using bumper brackets 14. The bumper carries a hoist 16 that may be stored in the housing (FIGS. 1, 2 and 3) or raised for use (FIGS. 4 and 7). The hoist includes a mast 18 including a base 20 that is mounted on the bumper by a pivot 22 so that the mast will pivot between the raised and the stored positions. Affixed to the base 20 is a shaft 24 (FIG. 4) that supports a rotatable mast tube 26. The rotation of the mast is limited to 270° in order to prevent damage to the hydraulic hoses associated with the powered components of the hoist.

The base 20 has a base flange 28 at its top end. This is positioned immediately below a gear 30 on the mast tube. The gear 30 meshes with a drive gear 32 on the output shaft of an orbital motor 34 mounted on the base 20. Actuation of the motor will rotate the mast tube 26 between its rotational limits. The base also carries a latch block 36 (FIG. 4) that is engaged by a hook 38 to lock the mast in the upright position. The hook is pivotally mounted on the bumper by a fixed pivot 40.

At the top end of the mast tube is a boom 42. This includes a boom bracket 43 connected to the mast tube by a pivot 44. The boom includes an outer tube 46 that is affixed to the boom bracket and an inner square tube 48 (FIGS. 4 and 7) that slides telescopically inside of the outer tube. The sliding action is assisted with wear plates (not shown) fastened to the inside of the outer tube near its outermost end and to the outside of the inner tube near its innermost end. These are made of low friction material for example polytetraflouroethylene (PTFE). The boom is telescopically extended by an internal extension cylinder 50.

A chain hook 112 extends from the end of the inner tube 48 of the boom. A pin hole 52 through the inner tube adjacent its outer end is used for pinning attachments to the boom, as will be described in the following. The boom is supported by a lift cylinder 54 extending between the outer tube and the mast tube 26 adjacent the mast rotating gear 30.

For stability, the hoist is equipped with two legs 56 and 58. Leg 56 includes an upper leg section 60 and a lower leg section 62 connected by a pin 64. The upper leg section 60 is rigidly connected to the bottom of the mast base 20. The bottom end of the lower leg section 62 is pivotally coupled by a hinge 68 to an elongate channel 66 that serves as a ground engaging foot.

The other leg 58 is similarly constructed with an upper leg section 70 pivotally mounted on the bumper by pivot 72 and connected to a lower leg section 74 by a pin 76. The lower leg section is pivotally connected to the channel 66 by a hinge 78.

A tie rod 80 has one end connected to the upper leg section 60 by a pin 82. The opposite end of the tie rod 80 is pivotally connected to a second tie rod 84 by a pin 86. The other end of rod 84 is pinned to the upper leg section 70 by a pin 88. The pin 86 is connected to one end of a link 90, mounted on the bumper housing by a fixed pivot 92.

Associated with the lower leg section 62 of leg 56 is a link 94 connected to a fixed pin 96 on the bumper and to a pin 98 on the lower leg section 62. Similarly, a link 100 is connected to a fixed pin 102 and to a pin 104 on the lower leg section 74 of leg 58.

To control movement of the hoist between its raised position and its stored position, a cylinder 106 is connected to a fixed pivot 108 on the bumper and to a pin 110 on the upper leg section 60 of leg 56.

With the hoist in the stored condition illustrated in FIG. 3, the extension of cylinder 106 pivots the mast base about the pivot 22. This carries the upper leg section 60 to a vertical position, which in turns swings the lower leg section 62 to a vertical position below the upper leg section. The tie rods 82 and 84 likewise pivot the upper leg section 70 about its fixed pivot to bring the upper leg section 70 and lower leg section 74 into vertical alignment. The boom is then raised by extending the lift cylinder 54, at which time the hoist is ready for use.

FIGS. 5 and 6 illustrate certain attachments that may be used in conjunction with the hoist. FIG. 5 illustrates a "cherry picker" attachment 118 for the hoist of this attachment includes a jib 120 with a base 122 that fits over the end of the inner tube 48. A transverse bore 124 in the base 122 lines up with the pin hole 52 through the inner tube of the boom so that the two can be pinned together. The outermost end of the jib is connected to a transverse pin 126 mounted on a bucket 128 that can be used for raising a worker to an elevated height, for example for repairing traffic lights or pruning trees.

FIG. 6 illustrates a remote control 130 for the hoist. This includes a control unit 132 connected to a long, flexible umbilical 134. The umbilical itself is coupled by quick-release fittings 136 to mating quick-release fittings 138 on the boom, near the outer end of the outer tube 46. This enables control of the hoist from any location, on the ground, in the bucket 128 or from the box of a truck on which the hoist is mounted.

The mounting of the hoist on a pickup truck as the rear bumper is illustrated in FIG. 7 of the drawings.

As discussed in the foregoing, the hoist may be used as a general purpose hoist or it may also be used in cases where a person is to be raised, for example for servicing traffic lights. A winch and pulley assembly can be mounted on the hoist to provide added flexibility.

Another optional attachment for the hoist is a mesh tail gate that mounts on top of the boom. This closes the back of a truck box when the hoist is in its stored position.

While a currently-preferred embodiment of the present invention has been described in the foregoing, it is to be understood that other embodiments are possible within the scope of the invention. The invention is to be considered limited solely by the scope of the appended claims.

I claim:

1. A hoist comprising:
an elongate housing;
means for mounting the housing across a vehicle frame as a bumper;
a mast pivotally mounted on the housing for movement between a stored, lateral position within the housing and an upright, extended position projecting upwardly out of the housing;
a boom pivotally mounted on the mast for pivotal movement between a stored position extending along the mast and an in-use position projecting from the mast;
support legs mounted on the housing at positions spaced therealong for movement of each leg between a stored position substantially within the housing and an extended position projecting downwardly from the housing for supporting the housing on a ground surface; and
linkage means coupling the support legs and the mast for moving the support legs between the stored and extended positions of the support legs simultaneously with movement of the mast between the stored and extended positions of the mast.

2. A hoist according to claim 1 including power-operated hoist extending means for moving the mast and the support legs between their respective stored and extended positions.

3. A hoist according to claim 2 including power-operated boom raising means for selectively pivoting the boom from its stored position through a range of in-use projections projecting from the mast.

4. A hoist according to claim 3 wherein the boom comprises at least two parts which are telescopically extendible and contractible and including power-operated boom extending means for extending and contracting the boom.

5. A hoist according to claim 4 wherein at least an upper portion of the mast is rotatable about an upright axis when the mast is in its extended position.

6. A hoist according to claim 5 including power-operated mast rotating means for rotating the mast.

7. A hoist according to claim 1 including a bucket and bucket mounting means for attaching the bucket to the boom at a free end of the boom.

8. A hoist according to claim 7 wherein the bucket mounting means include a jib, means for mounting the jib on the boom and means for mounting the bucket on the jib.

9. A hoist according to claim 1 wherein the support legs each comprise an upper part pivotally mounted on the housing and a lower part pivotally mounted on the upper part.

10. A hoist according to claim 9 wherein the linkage means comprise tie rod means coupling the upper leg parts to pivot simultaneously between their stored positions and their extended positions.

11. A hoist according to claim 10 wherein the linkage means comprise links coupling the lower leg parts to the housing for pivoting the lower leg parts simultaneously between their stored and extended positions.

12. A hoist according to claim 11 including an elongate foot and means pivotally connecting the bottom end of each leg to the foot.

13. A hoist according to claim 6 including control means for independently controlling operation of the boom pivoting means, the boom extending means and the mast rotating means.

14. A hoist according to claim 13 wherein the control means comprise a control unit and an elongate, flexible umbilical connecting the control unit to the hoist.

15. A hoist according to claim 14 wherein the umbilical is releasably connected to the boom at a position remote from the mast.

* * * * *